Aug. 15, 1933.  F. A. PARSONS  1,922,633
TRANSMISSION AND CONTROL MECHANISM
Filed Dec. 3, 1931  5 Sheets-Sheet 1

INVENTOR
Fred G. Parsons

Aug. 15, 1933.    F. A. PARSONS    1,922,633
TRANSMISSION AND CONTROL MECHANISM
Filed Dec. 3, 1931    5 Sheets-Sheet 2

INVENTOR
Fred G Parsons

INVENTOR
Fred A Parsons

Fig.12

Patented Aug. 15, 1933 1,922,633

UNITED STATES PATENT OFFICE 1,922,633

TRANSMISSION AND CONTROL MECHANISM

Fred A. Parsons, Milwaukee, Wis., assignor to Kearney & Trecker Corporation, West Allis, Wis.

Application December 3, 1931. Serial No. 578,685

5 Claims. (Cl. 90—21)

This invention relates to milling machines and more particularly to drive and control mechanism for cutting helical grooves or threads with such machines.

When used for such purposes the work is traversed axially and rotated in exact timing with the axial movement to generate the desired lead or angle of groove. The timing is accomplished by suitable gearing connecting the table screw and the work. For relatively large helix angles it is satisfactory or preferable to apply the driving power to the table screw which in turn drives the work through the gearing, but for small helix angles it is preferable to apply the driving power to drive the table screw through the connecting gearing. In either event it is desirable to provide an automatic trip to simultaneously stop both the traverse and rotational movements when the cutting operation is completed. The transmission and trip devices previously incorporated in milling machines are not well adapted for the automatic trip just mentioned except in some instances in the cutting of the relatively large helix angles where the drive is through the table screw to the gearing connecting the screw and work piece.

It is an important object of the invention to provide an improved transmission and control arrangement for cutting of helical grooves of both long and short lead and including trip mechanism adapted for use with either lead.

Another purpose is to provide such mechanism in which the trip mechanism operates in a similar manner both for long and short leads, using the same or similar table dogs and the same trip elements at least in such part as is of concern to the operator who is setting up or adjusting the machine.

Other purposes relate to improved arrangements of transmissions including tool and work spindle trains and feed and quick traverse drives and improved specific relationships thereof for cutting helical grooves or threads of both small and large angle and improved and simplified control mechanism therefor.

Another purpose is generally to simplify and improve the construction and operation of mechanism for generating helical grooves or threads, particularly on a milling machine and particularly with respect to the transmission and control mechanism.

The invention consists in the construction and combination of parts as herein illustrated, described, and claimed and in such modifications thereof as may be equivalent thereto.

Like reference characters indicate the same parts throughout the specification and annexed drawings, in which.

Figures 1, 5:
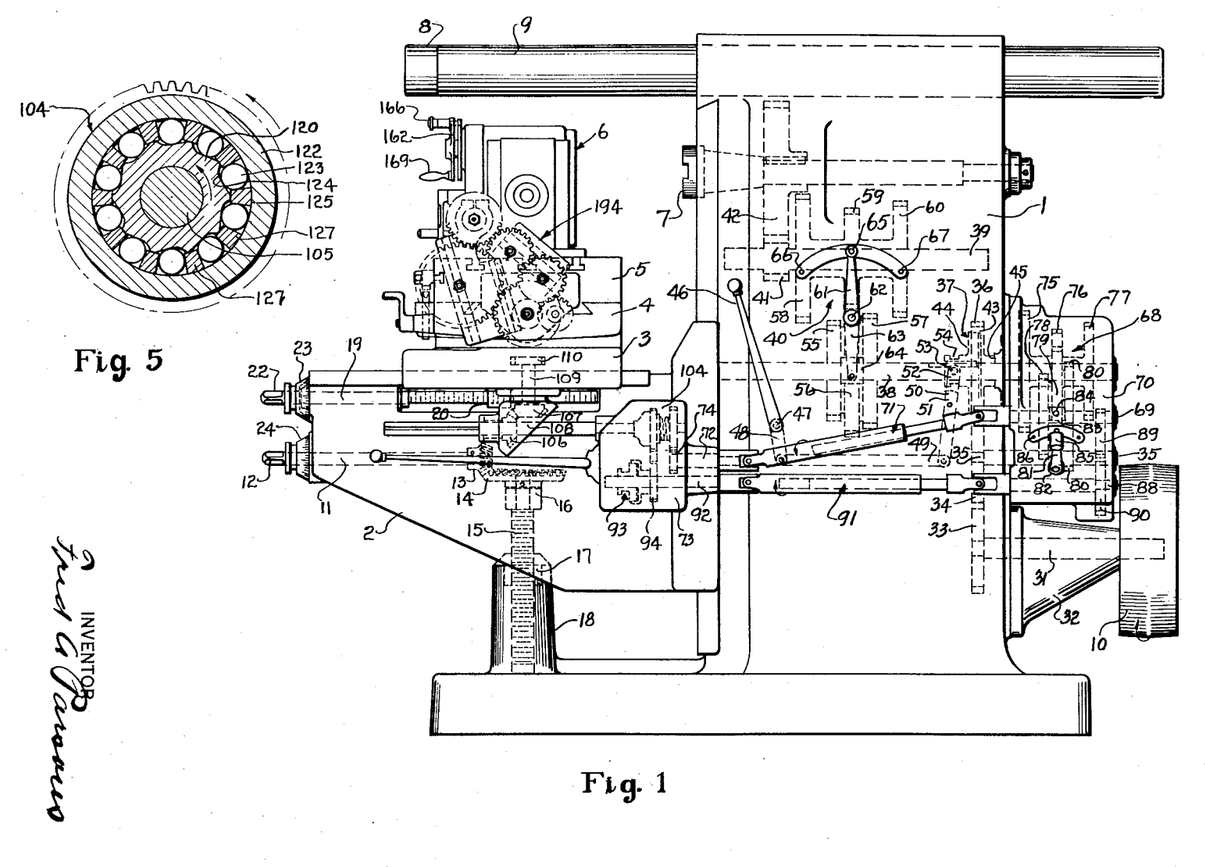
Fig. 1 is a right side elevation of a typical machine illustrating the invention.
Fig. 5 is a sectional view on the line 5—5 of Fig. 4.

As indicated in Fig. 1, the machine comprises a column or support 1 constituting a foundation for the various parts of the machine. A knee or support 2 is slidably fixed with column 1 and may be vertically adjusted along a face thereof and clamped therewith when desired by suitable or well-known means not shown. A swivel carriage or support 3 is supported from knee 2 and is adjustable toward and from column 1 on suitable guide surfaces on knee 2, swivel carriage 3 supporting a saddle or support 4 for angular adjustment relative thereto in a manner well understood in machines of this type. Saddle 4 carries for reciprocation thereon a work table or support 5, in the present instance having a dividing head or support generally denoted by numeral 6 mounted thereon. Column 1 also supports for rotation a tool spindle or support 7 axially transverse to normal paths of movement of table 5 adapted to carry a cutting tool, or the like, not shown, in position for operating upon a work piece supported from table 5. Overarms 8 and 9 are adjustably supported from column 1 for use in certain operations of the machine in familiar manner, and a pulley 10 forms a power source from which certain of the supports may be operated through appropriate power trains.

Movement of knee 2 may be obtained through the actuation of a shaft 11 by means of a crank, or the like, not shown, applied to a squared portion 12 thereof, the shaft being journaled in knee 2 and actuating, through bevel gears 13 and 14, an elevating screw 15 engaging a suitable thrust bearing 16 fixed with knee 2 and threaded in a nut portion 17 fixed with a pedestal 18 fixed with an extended portion of column 1. Rotation of shaft 11 will accordingly cause rotation of screw 15 and vertical movement of knee 2.

Swivel carriage 3 may be horizontally adjusted relative to knee 2 by means of a screw shaft 19 journaled in knee 2 and prevented from axially moving therein, the screw engaging a nut portion 20 depending from carriage 3 into a suitable recess 21 in knee 2. Screw 19 may be rotated by means of a crank, or the like, not shown, applied to a squared portion 22 formed on the screw. Dials 23 and 24 are fixed respectively with screw 22 and shaft 12 in familiar manner for indicating the extent of movement of the members involved.

Figure 2:
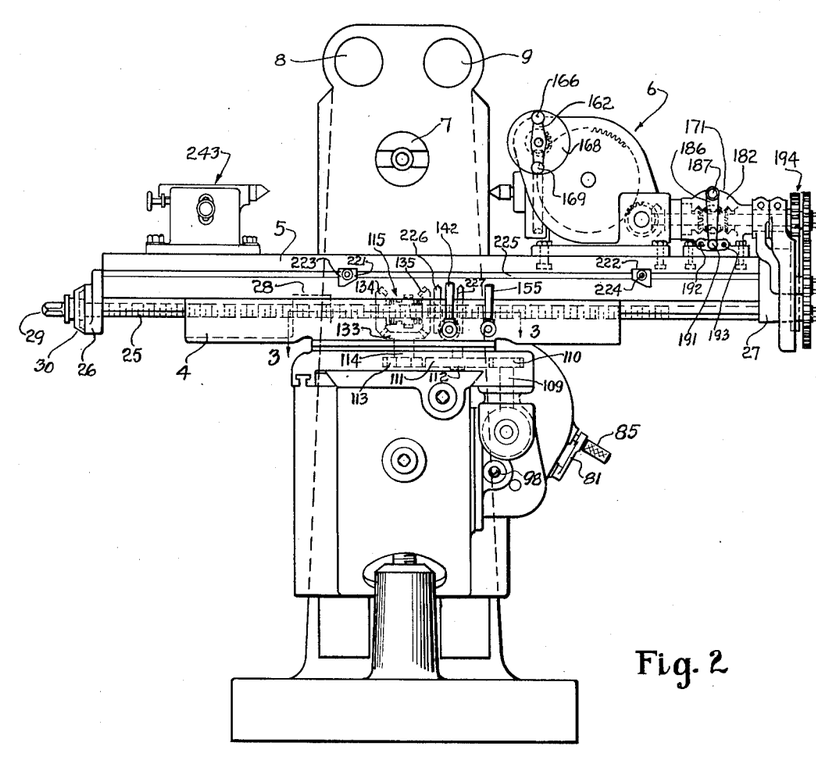
Fig. 2 is a front elevation of the same machine.

Table 5 may be moved by rotation of a table screw 25, Fig. 2, journaled in suitable bearings 26 and 27 fixed with the table and adapted to prevent relative axial movement between the screw and table, the screw engaging a nut portion 28 fixed with saddle 4 whereby rotation of the screw will cause sliding movement of the table. Screw 25 may be rotated by means of a crank, or the like, not shown, applied to a squared portion 29 and a dial 30 may be fixed with the screw for indicating the extent of the movement in well-known manner. Screw 25 may also be rotated by power, as will be fully described presently.

Figure 12:
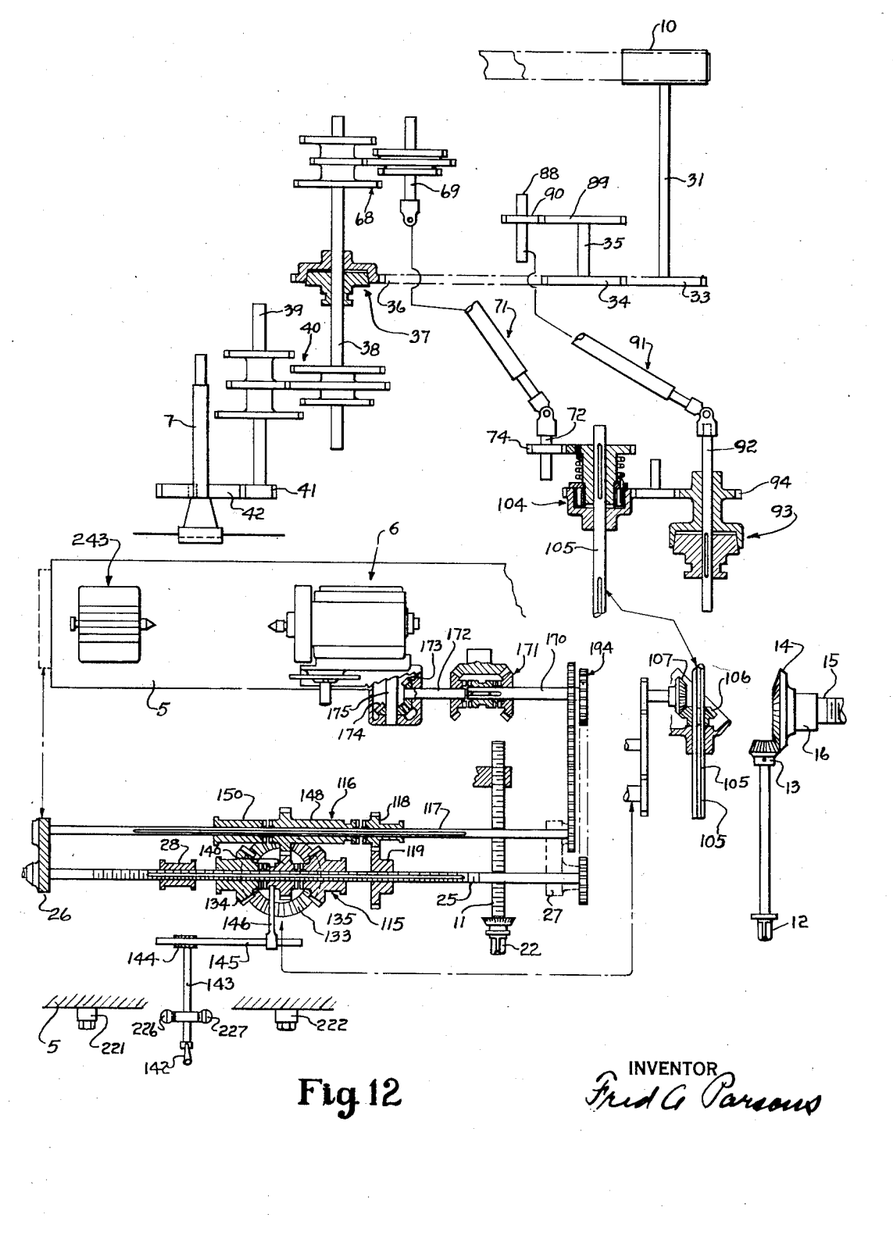
Fig. 12 is a schematic sectional view in the nature of a development showing the operative relationship of the various parts of the machine.

Turning to Figs. 1 and 12, the train for rotation of spindle 7 is as follows: Pulley 10 is fixed with and drives a shaft 31 journaled in a bracket portion 32 fixed with column 1, the shaft driving through a gear 33 fixed therewith and an idler 34 fixed with a shaft 35, a gear 36 constituting part of a motion interrupting device or clutch generally denoted by numeral 37. Clutch 37 drives a shaft 38 journaled in column 1 and driving a shaft 39 through a rate changer generally denoted by numeral 40, shaft 39 driving spindle 7 through gears 41 and 42 meshed together and fixed respectively with the shaft and spindle.

Clutch 37 comprises outer and inner members 43 and 44 having suitable inter-engaging friction surfaces, member 43 being journaled on shaft 38 and maintained in suitable axial position thereon as by a collar, or the like, 45 and member 44 being slidably keyed with shaft 38. Member 44 may be moved axially into and out of engagement with member 43 by movement of a hand lever 46 fixed with a shaft 47 extending into column 1 and carrying a lever 48, the lever being pivotally connected through a link member 49 with a lever 50 pivoted on a stud 51 fixed with column 1. Lever 50 has a forked end 52 carrying pivoted shoes, or the like, 53 engaging an annular groove 54 formed in a portion of member 44. Movement of lever 46 to the left and right in Fig. 1 will accordingly cause disengagement and engagement respectively of member 44 with member 43.

Rate changer 40 comprises a member consisting of gears 55, 56, and 57 slidably keyed with shaft 38 and engageable one at a time respectively with gears 58, 59, and 60 fixed with shaft 39. The various gears are of different diameters whereby engagement of different pairs will result in different speeds of operation of shaft 39 and accordingly of spindle 7. Gears 55, 56, and 57 may be shifted into engagement with one or another of gears 58, 59, and 60 by means of a hand lever 61 fixed with a shaft 62 extending into the interior of column 1 and carrying a lever 63 which has pivoted thereto a member 64 adapted to engage the sides of gear 56. Movement of lever 61 will accordingly cause sliding movement of gears 55, 56, and 57, the parts being retained in desired positions by engagement of a spring plunger or detent member 65 forming a grip portion for lever 61 with suitable sockets or holes such as 66 and 67 formed in column 1.

A feed train for movement of table 5 originates in above mentioned shaft 38, Figs. 1 and 12, the shaft driving, through a rate changer generally denoted by numeral 68, a shaft 69 journalled in a housing portion 70 fixed with column 1, the shaft being coupled, through an extensible universal joint shaft of well-known construction generally denoted by numeral 71, with a shaft 72 journaled in a housing portion 73 fixed with knee 2, shaft 72 carrying a gear 74 forming the terminal element of the feed train.

Rate changer 68 comprises gears 75, 76, and 77 spaced apart on shaft 38 within housing 70 and engageable one at a time with gears 78, 79, and 80 fixed together and forming a unitary member slidably keyed with shaft 69, the gears being of different diameters whereby engagement of different pairs will result in different rates of rotation of shaft 69. Gears 78, 79, and 80 may be shifted by means of a lever 81 fixed with a shaft 82 extending into housing member 70 and carrying a lever 83 having a member 84 pivoted thereto and engaging the sides of gear 79 whereby movement of lever 81 will cause sliding of gears 78, 79, and 80 and engagement thereof with one or another of gears 75, 76, and 77, the parts being retained in desired positions by means of a spring plunger or detent 85 forming a grip portion for lever 81 and engageable with one or another of sockets or holes such as 86 and 87 formed in housing member 70.

A rapid traverse train for movement of table 5 originates in above mentioned shaft 35 whereby it is operative independently of the condition of engagement of clutch 37. Shaft 35 drives a shaft 88, journaled in housing member 70, through gears 89 and 90 meshed together and fixed with the respective shafts, shaft 88 driving, through an extensible universal joint shaft of well-known construction generally denoted by numeral 91, a shaft 92 journaled in above mentioned housing member 73 fixed with knee 2. Shaft 92 drives, through a motion interrupting device or clutch generally denoted by numeral 93, a gear 94 constituting the terminal of the rapid traverse train.

Figure 4:
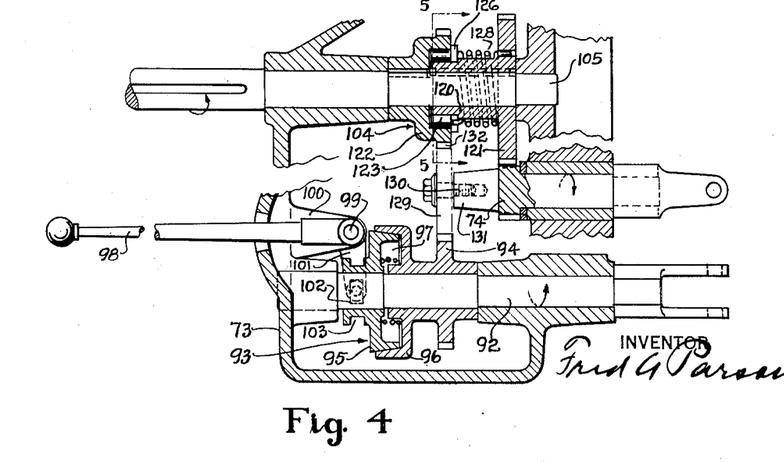
Fig. 4 is a development of certain mechanism indicated in Fig. 1.

Clutch 93, as more particularly shown in Fig. 4, comprises inner and outer members 95 and 96, the members having suitable interengaging friction surfaces for establishing driving relationship therebetween. Member 95 is slidably keyed with shaft 92 and member 96 is journaled thereon and fixed with above mentioned gear 94, the members being normally disengaged from each other by means of a compression spring 97. Member 95 may be forced into engagement with member 96 through downward movement of a lever 98 fixed with a shaft 99 journaled in a bracket portion 100 fixed with housing 73, shaft 99 carrying a lever 101 having pivoted thereto a shoe 102 engaging an annular groove 103 formed in a projecting portion of member 95. Downward pressure of lever 98 will accordingly cause engagement of member 95 with member 96 against the resistance of spring 97, the spring returning the parts to disengaged position upon release of such downward pressure.

The drive continues alternatively from terminal elements 74 and 94 through an overrunning clutch generally denoted by numeral 104 to a shaft 105, Figs. 1 and 12, journaled in housing 73, the shaft driving, through bevel gears 106 and 107 located in a housing 108 fixed with a portion of swivel carriage 3, a vertical shaft 109 carrying a gear 110. Gear 110, as more particularly shown in Fig. 2, drives, through an idler 111 journaled on a stud 112 fixed in swivel carriage 3, a gear 113 fixed with a shaft 114 extending vertically into saddle 4 and driving, through a reverser generally denoted by numeral 115, a clutch or motion interrupter generally denoted by numeral 116, Fig. 3, the clutch communicating motion alternatively to a drive shaft 117 or to table screw 25 through a gear 118 meshing with a gear 119 slidably keyed with table screw 25.

Referring to Figs. 4 and 5, overrunning clutch 104 comprises an inner portion 120 journaled on shaft 105 and driven from gear 74 through a gear 121 fixed with portion 120. Portion 120 drives an outer portion 122 through a plurality of rolls 123, each roll being disposed in a recess 124 formed in member 120 and adapted through a wedging action caused by the contour of recesses 124 to transmit the drive from member 120 to outer member 122, the roll upon rotation of member 120 in a counterclockwise direction, as seen in Fig. 5, gripping an inner surface 125 of member 122. The rolls are spaced apart by means of a spacer or cage member 126, Fig. 4, having fingers 127—127, Fig. 5, extending between adjacent rolls. Cage member 126 is urged in a clockwise direction in Fig. 5 by means of a torsion spring 128, Fig. 4, anchored in gear 121 and tending at all times to keep rolls 123 yieldably in driving relation with members 120 and 122. Thus a rigid driving relation is established between members 120 and 122 whenever member 120 is rotated in the intended direction. In the event, however, that member 122 is rotated, for example by the above explained rapid traverse train at a rate in excess of that of member 120, rolls 123 and cage 127 will be carried around by member 122 in a counterclockwise direction with relation to member 120, the rolls relinquishing their grip upon member 122 and permitting free rotation thereof without interference from or with member 120.

Gear 94 may so drive member 122 through an idler 129 journaled on a stud 130 fixed with a bracket portion 131 of housing 73, the idler engaging a gear 132 fixed with member 122.

Figure 3:
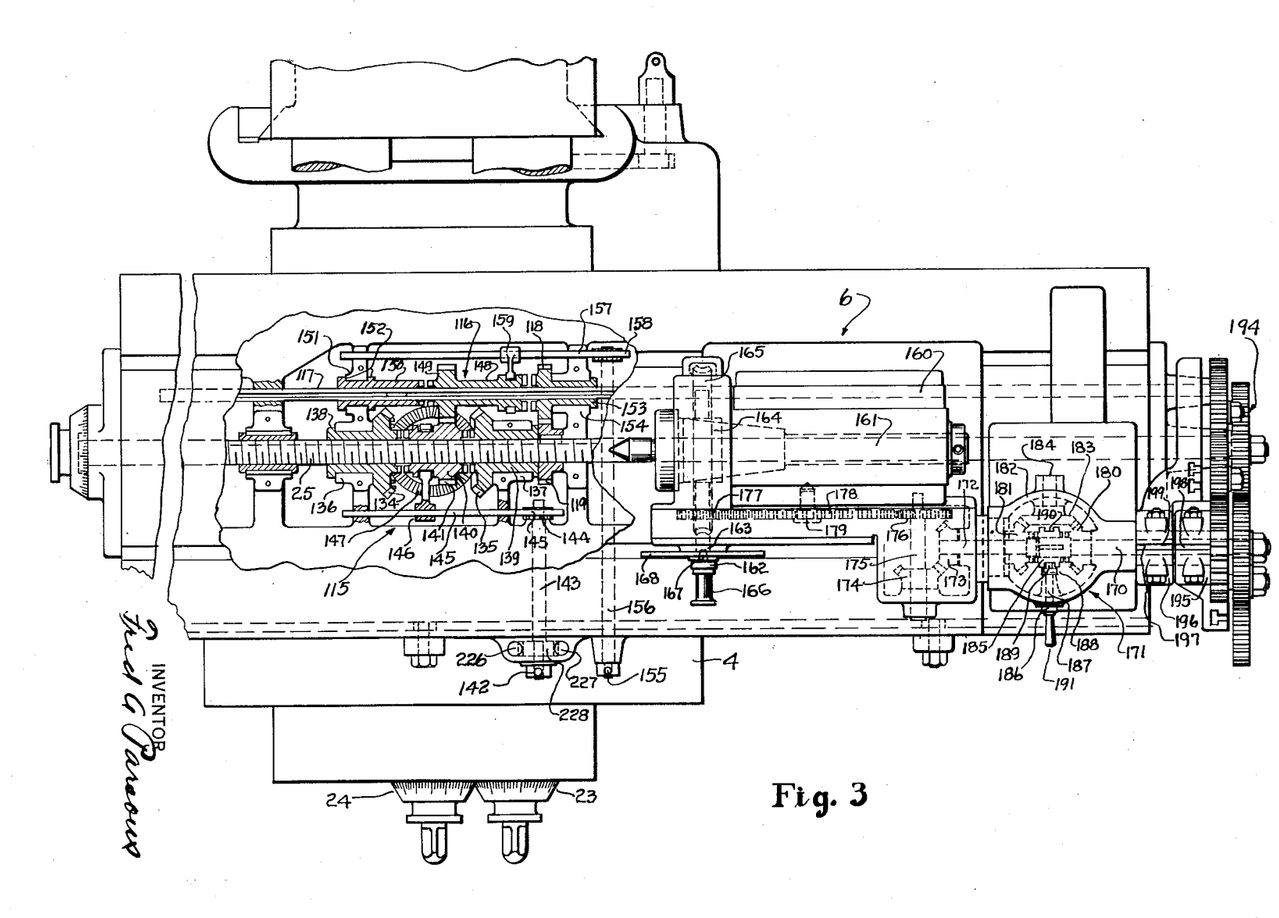
Fig. 3 is a plan view of a portion of the machine partly in section along the line 3—3 of Fig. 2.

Reverser 115, Fig. 2, comprises a bevel gear 133 fixed with vertical shaft 114 and driving in opposite directions bevel gears 134 and 135 spaced apart and journaled in suitable bearings 136 and 137 respectively, Fig. 3, in saddle 4 by means of extended hub portions 138 and 139. The gears have aligned bores through which table screw 25 may freely slide and a clutch member 140 is slidably journaled on screw 25 between gears 134 and 135, there being suitable clutch teeth fixed with member 140 for engagement with clutch teeth formed on gear 134 upon movement of the member in one direction and other clutch teeth for engagement with clutch teeth formed on gear 135 when the member is moved in the opposite direction. Clutch member 140 drives clutch 116 through a gear 141 and member 140 may be shifted into engagement with one or the other of gears 134 and 135 from a hand lever 142 fixed with a shaft 143 journaled in a portion of saddle 4 and actuating, through a gear 144, a rod 145 slidable in saddle 4 and having rack teeth formed therein engaging the gear, a fork member 146 being fixed with rod 145 and engaging an annular groove 147 formed in clutch member 140. The engagement of clutch member 140 with one or the other of gears 134 and 135 will accordingly drive clutch member 116 in one or the other direction.

Clutch 116 comprises a sleeve member 148 journaled on above mentioned drive shaft 117 and driven from clutch member 140 by means of a gear 149 meshing with gear 141, the gears having sufficiently wide faces to allow axial movement of either clutch member without disengagement thereof from the other. Sleeve 148 has suitable clutch teeth formed thereon for engagement with clutch teeth formed on a sleeve 150 slidably keyed with shaft 117 and supported in a bearing 151 fixed with saddle 4, sleeve 150 being prevented from axially moving by suitable collars 152, or the like. Sleeve 148 also has clutch teeth for engagement with suitable clutch teeth formed on above mentioned gear 118. Movement of sleeve 148 in one direction will accordingly cause driving of shaft 117 from reverser 115, while movement thereof in the opposite direction will cause driving of table screw 25 through gears 118 and 119, as above outlined.

Sleeve 148 may be so moved from a hand lever 155 fixed with a shaft 156 journaled in saddle 4 and actuating a shifter rod 157 slidable in the saddle, the rod having suitable rack teeth engaging a gear 158 fixed with shaft 156 and a shifter fork 159 engaging a suitable annular groove formed in sleeve 148.

Dividing head 6 may be of any suitable or desired type, in the present instance comprising a housing portion 160, Fig. 3, adapted to be secured to table 5 in any suitable or well-known manner, not shown, and having journaled therein a spindle or support 161. Spindle 161 may be rotated manually from an index lever or crank 162 fixed with a shaft 163 extending into housing 160 and carrying a worm 164 engaging and driving a worm wheel 165 fixed with spindle 161. Crank 162 may have a grip portion 166 adapted to actuate a spring pressed pin or plunger 167 engaging suitable holes in an index plate 168, the selection of desired numbers of holes determining desired fractional revolutions of spindle 161 in well-known manner. Plunger 167 may be locked out of engagement with plate 168 by suitable or well-known means, not shown, when desirable, as when it is necessary to make several complete turns of crank 162 and for convenience in so turning the crank a second grip portion 169, Figs. 1 and 2, is fixed with a portion of crank 162.

Spindle 161 may also be rotated by power for certain purposes, for example, for milling spirals, threads, or the like, through a drive shaft 170 driving, through a reverser generally denoted by numeral 171, a shaft 172 which in turn drives, through bevel gears 173, 174, a shaft 175. Shaft 175 drives above mentioned shaft 163 through gears 176 and 177 fixed with the respective shafts and connected by means of an idler 178 journaled on a stud 179 fixed with a portion of housing 160.

Reverser 171 comprises bevel gears 180 and 181, gear 180 being journaled on shaft 170 and gear 181 being fixed with shaft 172, both within a suitable housing 182 and connected by a bevel gear or idler 183 fixed with a shaft 184 journaled in housing 182. A clutch member 185 is slidably keyed on an extended portion of shaft 170 between gears 180 and 181 and has suitable clutch teeth for engagement when moved in one direction with clutch teeth formed on gear 180 and other clutch teeth for engagement when moved in the opposite direction with clutch teeth formed on gear 181. When clutch member 185 is moved in one direction, for example, to the left in Fig. 3, shaft 170 will drive shaft 172 through clutch member 185 and gear 181, the two shafts rotating in the same direction. When clutch member 185 is moved in the opposite direction, shaft 170 will drive shaft 172 through clutch member 185, gear 180, idler 183, and gear 181, the shafts then turning in opposite directions.

Clutch member 185 may be shifted by means of a hand lever 186, Fig. 2, fixed with a shaft 187 extending into housing 182 carrying a lever 188, Fig. 3, having a pivoted shoe, or the like, 189 engaging an annular groove 190 formed in clutch member 185, movement of lever 186 accordingly shifting clutch member 185 into a desired position. Lever 186 has a grip portion 191 comprising a spring pressed plunger adapted to engage sockets or holes such as 192 and 193, Fig. 2, formed in a portion of housing 182.

Figures 6, 7, 8, 10:
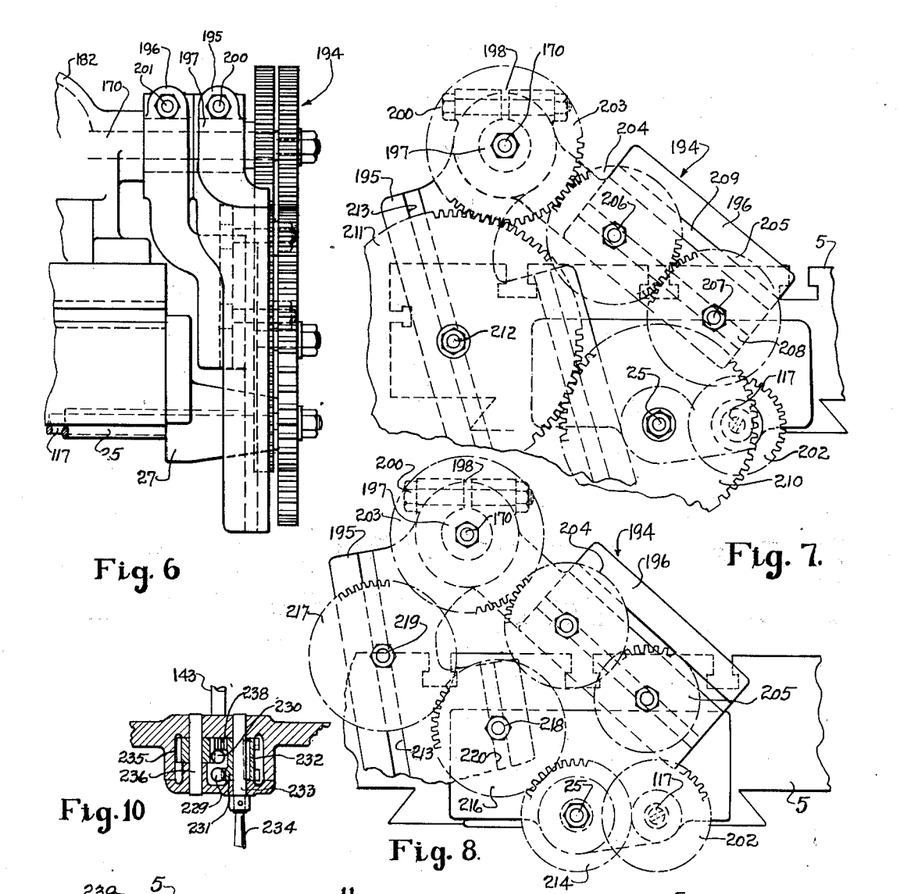
Fig. 6 is an enlarged front elevation of certain mechanism indicated in Fig. 2.
Fig. 7 is a right side elevation of the same.
Fig. 8 is a similar view showing a somewhat different set-up.
Fig. 10 is a sectional view on the line 10—10 of Fig. 9.

Shaft 170 may be driven alternatively from table screw 25 or from above mentioned drive shaft 117 through a rate changer or gear set generally denoted by numeral 194, more particularly shown in Figs. 6, 7, and 8, the rate changer comprising brackets 195 and 196 pivotally supported from an extended portion 197 of housing 182, the brackets being slotted at 198 and 199 respectively and capable of being clamped with portion 197 in various desired positions by means of bolts 200 and 201, the brackets carrying removable gears which may be placed in suitable relations thereon to give the desired driving connections between the several shafts, typical illustrative set-ups being shown in Figs. 7 and 8.

Thus Fig. 7 shows a set-up for cutting a thread or spiral, or the like, having a relatively small lead, shaft 170 in this instance preferably being driven from above mentioned drive shaft 117, table screw 25 then being driven from shaft 170 through suitable gears, the result being to avoid a step-up in speed which would otherwise be necessary between the screw and shaft 170. A gear 202 is removably fixed with shaft 117 and drives a gear 203 removably fixed with shaft 170 through idlers 204 and 205 journaled respectively on studs 206 and 207 adjustably fixed in a T-slot 208 in bracket 196, a second T-slot 209 being provided in the bracket for use when necessary in other set-ups. Gear 203 drives a gear 210, removably fixed with table screw 25, through an idler 211 journaled on a stud 212 adjustably fixed in a T-slot 213 in bracket 195. With this arrangement of gear set 194, above mentioned, clutch 116, Fig. 3, would be set to drive shaft 117, clutch member 148 engaging sleeve member 150, and table screw 25 accordingly being free to be driven independently of clutch 116 as, for example, by means of gear set 194.

The particular advantage in driving table screw 25 indirectly in this manner may be outlined as follows: In the event that a small lead is desired in a spiral or thread being cut, relatively slow rotation of the table screw is necessary relative to the rotation of the work piece. The rotation of shaft 170 is, of course, proportional to the rotation of the work piece and accordingly relatively rapid. With the conventional arrangement of gears between screw 25 and shaft 170 it would accordingly be necessary to use a relatively low feed on the table screw and then by means of suitable gearing step up the rotation of shaft 170 to the necessary high rate, such arrangement giving relatively poor efficiency and introducing large stresses in the gearing, particularly if it is desired to use the rapid traverse for idle movements of table 2, the speed of shaft 170 then becoming excessive. With the present arrangement a reasonable ratio between shaft 117 and shaft 170 may be adopted and a high enough feed selected to give the necessary rate of rotation in shaft 170, this rate then being reduced through gears 203, 211, and 210 to the proper speed in table screw 25. The efficiency under these conditions would normally be very good and the use of the rapid traverse would not step up the speed of shaft 170 to any unreasonable figure, the resulting stresses in the gearing being entirely within reason.

The set-up shown in Fig. 8 is illustrative of the operation when cutting a spiral having a relatively long lead, in this instance a gear 214 fixed with table screw 25 driving gear 203 fixed with shaft 170 through idlers 216 and 217 journaled each respectively on studs 218 and 219 adjustably fixed respectively in T-slots 213 and 220 in bracket 195. In this situation clutch 116, Fig. 3, is engaged to drive table screw 25, clutch member 148 being engaged with gear member 118 and accordingly disengaged from sleeve member 150. Shaft 117 may be allowed to run idle, driven from gear 203 through above mentioned idlers 204 and 205 driving gear 202 or bracket 196 may be rotated slightly about portion 197, as shown, to disengage idler 205 from gear 202, as indicated, or, if desirable, of course, idlers 204 and 205 may be removed entirely from bracket 196. With this set-up there will obviously be no loss of efficiency through excessive speed in shaft 170 even when the rapid traverse is used for table movement and the stresses in the gearing may always be kept within the bounds of good practice.

Automatic stop of table movement may be obtained at any desired point in the movement of table 5 by any suitable or well-known means, in the present instance comprising dogs 221 and 222, Figs. 2 and 12, adjustably fixed with table 5 by means of bolts, or the like, 223 and 224 respectively, engaging a suitable T-slot 225 formed in the table, the dogs actuating respectively plungers 226 and 227 vertically slidable in saddle 4 and having suitable rack teeth engaging opposite sides of a gear 228 fixed with above mentioned shaft 143. The arrangement of the parts is such that table 5, when screw 25 is driven through reverser 115 and clutch 116, will feed or traverse in the direction in which lever 142 is moved. In order to make available the automatic stop, it is essential that this relation be preserved and it is accordingly important when table screw 25 is driven indirectly through drive shaft 117 that the requisite number of idlers, including any gear on shaft 170, be provided to drive screw 25 in a direction opposite to that of shaft 117, as is the case when the screw is driven through clutch 116 and gears 118 and 119. Reverser 171 may then be utilized to obtain the desired direction of rotation of dividing head spindle 161, regardless of the direction of rotation of shaft 170, and incidentally it is possible to form either a right-hand or a left-hand spiral with the same arrangement of gear set 194 and with either direction of table movement by proper setting of reverser 171.

Figure 9:
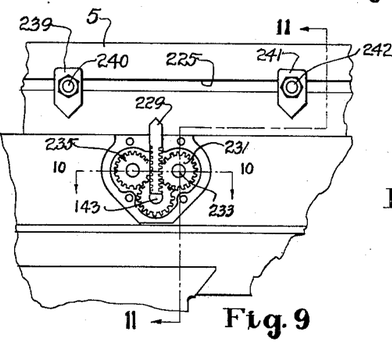
Fig. 9 is a view of a portion of Fig. 2 with certain parts removed showing a modified form of trip mechanism.
Figure 11:
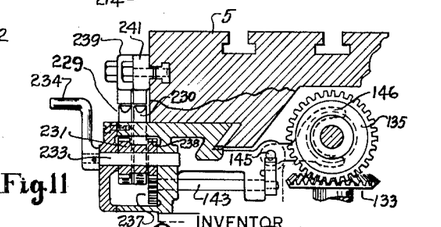
Fig. 11 is a sectional view on the line 11—11 of Fig. 9.

In some instances it may be found preferable to utilize a slightly different type of trip mechanism for stopping table 5 whereby it will be unnecessary to maintain the relative directions of rotation between drive shaft 117 and table screw 25. Such a mechanism, for example, comprises, as shown in Figs. 9, 10, and 11, plungers 229 and 230 vertically slidable in a portion of saddle 4 and situated in a plane transverse to the path of movement of table 5. Plunger 229 has rack teeth engaging a gear 231 forming part of a member 232 fixed with a shaft 233 journaled in saddle 4, the shaft having a hand lever 234 fixed therewith for manual operation. Plunger 230 has rack teeth engaging a gear 235 fixed with a shaft 236 journaled in saddle 4. Gear 235 meshes with and drives a gear 237 fixed with above mentioned shaft 143 and a gear 238 forming part of member 232 also meshes with gear 237 whereby movement of one plunger downwardly will cause rotation of shaft 143 in one direction and raising of the other plunger. Plunger 229 may be contacted at a predetermined point in the movement of table 5 by a dog 239 fixed by means of a bolt 240 with above mentioned T-slot 225 formed in table 5, and plunger 230 may be similarly contacted by means of a dog 241, fixed with table 5 by means of a bolt 242 acting in T-slot 225, the dogs extending different distances from table 5, as more particularly shown in Fig. 12, whereby either dog may contact one plunger but not the other. It thus becomes possible to cause automatic stop of table 5 regardless of the direction of movement of the table relative to the movement of lever 234, it being merely necessary to position the appropriate dog for contacting the particular plunger which happens to be raised. With this arrangement of trip plungers it is accordingly possible to set up the gears in rate changer 194 without regard for the resulting direction of rotation of table screw 25 with the assurance that an automatic stop of the table may be obtained by merely suitably positioning dogs 239 and 241. As in the previous case, reverser 166 may be utilized to obtain the desired direction of spindle 161 regardless of the direction of rotation of shaft 170, the reverser also permitting the formation of either right or lefthand spirals in either direction of table movement without regard for the particular arrangement of gears in rate changer 194. For use in conjunction with dividing head 6 a tailstock of well-known type generally denoted by numeral 243, Figs. 1 and 12, may be fixed with table 5 by suitable or well-known means.

The above being a full and complete description of an illustrative embodiment of the invention, what is claimed is:

1. In a milling machine, the combination of a rotatable tool spindle, a rotatable work spindle, a support movable for relative bodily reciprocatory movement of said spindles, a screw element and a nut element relatively rotatable for establishing said reciprocatory movement, a motion transmitting connection including rate change gearing and connecting one of said screw and nut elements with said work spindle for establishing predetermined relative rates of rotation thereof, alternative power trains connectible with the last mentioned element, one of said trains including said gearing and the other excluding said gearing, motion interrupting means operable for disconnecting the connected one of said power trains, and a trip device dog operable in accordance with said reciprocatory movement during either of said alternative train connections for the operation of said motion interrupting means.

2. In a milling machine, the combination of a rotatable tool spindle, a rotatable work spindle, a support movable for relative bodily reciprocatory movement of said spindles, a train including rate change gearing and interconnecting said support and work spindle for determining the relative rate of said reciprocatory and rotary movements, a power source, mechanism for connecting said power source alternatively to drive said train between said work spindle and said gearing or between said gearing and said support, said mechanism including motion interrupting means operable to interrupt the driving one of said alternative driving connections to said train, and a trip device dog operable in accordance with said reciprocatory movement during either of said alternative driving connections for the operation of said motion interrupting means.

3. In a milling machine, the combination of a rotatable tool spindle, a rotatable work spindle, a support movable for relative bodily reciprocatory movement of said spindles, a screw element and a nut element relatively rotatable for establishing said reciprocatory movement, a motion transmitting connection including rate change gearing and connecting one of said screw and nut elements with said work spindle for establishing predetermined relative rates of rotation thereof, alternative power trains for driving the last mentioned element through said gearing or exclusive thereof, a shiftable motion interruption device common to both said power trains and operable to interrupt the driving one of said alternative driving connections thereof, and a trip device dog operable in accordance with said reciprocatory movement during either of said alternative train connections and connected for shifting said motion interrupting device.

4. In a milling machine, the combination of a rotatable tool spindle, a rotatable work spindle, a support movable for relative bodily reciprocatory movement of said spindles, a screw element and a nut element relatively rotatable for establishing said reciprocatory movement, a motion transmitting connection including rate change gearing and connecting one of said screw and nut elements with said work spindle for establishing predetermined relative rates of rotation thereof, a transmission for said tool spindle including a motion interrupter, a feed transmission driven from said tool spindle transmission through said motion interrupter and including a rate changer, alternative power trains for driving the last mentioned screw and nut element from said feed transmission through said gearing or exclusive thereof, feed interrupting means for disconnecting said feed transmission from said alternative power trains, and a trip device dog operable in accordance with said reciprocatory movement during either of said alternative train connections for the operation of said feed interrupting means.

5. In a milling machine, the combination of a rotatable tool spindle, a rotatable work spindle, a support movable for relative bodily reciprocatory movement of said spindles, a screw element and a nut element relatively rotatable for establishing said reciprocatory movement, a motion transmitting connection including rate change gearing and connecting one of said screw and nut elements with said work spindle for establishing predetermined relative rates of rotation thereof, a transmission for said tool spindle including a motion interrupter, feed and quick traverse trains each driven from said spindle transmission, said quick traverse train being driven to exclude said motion interrupter, a plurality of alternative power trains respectively connectible for driving the last mentioned screw and nut element through said gearing and exclusive thereof, each of said power trains being alternatively operable from said feed train or from said quick traverse train, means shiftable for disconnecting the connected one of said power trains and a power trip operable in accordance with said reciprocatory movement during either connection of said power trains and connected for operation of said shiftable means.

FRED A. PARSONS.